United States Patent [19]

Linde et al.

[11] Patent Number: 4,597,532

[45] Date of Patent: Jul. 1, 1986

[54] MATERIAL BREAKUP DEVICE FOR MANURE SPREADERS

[75] Inventors: Gilbert W. Linde, Oxford; Norman M. Stauffer, New Holland; Warren H. Brackbill, Paradise, all of Pa.

[73] Assignee: Sperry Corporation, New Holland, Pa.

[21] Appl. No.: 677,652

[22] Filed: Dec. 3, 1984

[51] Int. Cl.⁴ ............................................. A01C 19/00
[52] U.S. Cl. ................................... 239/675; 222/223; 239/144
[58] Field of Search ............... 239/142, 144, 675, 676, 239/683; 222/233

[56] References Cited

U.S. PATENT DOCUMENTS 3,796,354 3/1974 Steinke ........................... 239/675 X
4,467,967 8/1984 Martin .............................. 239/675 X

FOREIGN PATENT DOCUMENTS 201540 3/1939 Switzerland ........................ 239/683
1017225 1/1966 United Kingdom ................ 222/233
2124870 2/1984 United Kingdom ................ 239/675

*Primary Examiner*—Andres Kashnikow
*Attorney, Agent, or Firm*—Darrell F. Marquette; Frank A. Seemar; Larry W. Miller

[57] ABSTRACT

In a type of manure spreader including an auger rotatably mounted in a tank and an expeller disposed adjacent an opening in the tank to discharge manure from the tank, a material breakup device is pivotally mounted on a sidewall of the tank. The material breakup device is movable toward the auger to break up manure that is bridged above the auger. In operation, the material breakup device moves between an upper position where it is adjacent a sidewall of the tank and a lower position where it is adjacent the auger.

3 Claims, 2 Drawing Figures

MATERIAL BREAKUP DEVICE FOR MANURE SPREADERS

BACKGROUND AND SUMMARY OF THE INVENTION

Spreaders designed for handling semi-solid or slurry manure and solid manure generally include a tank for containing manure, an auger rotatably mounted in the bottom of the tank for moving manure toward an opening formed in the tank, and an expeller disposed at the opening in the tank to discharge manure in a lateral direction from the tank. One spreader of this general type is disclosed in U.S. Pat. No. 4,362,272.

When handling solid manure, a problem exists with such spreaders in that manure contained in the tank sometimes forms itself into a bridge above the auger thereby preventing this bridged manure from being conveyed toward the expeller by the auger. One attempt to overcome this problem has been to provide for the raising of the auger in the tank from its normal position into manure that may be bridged above the auger to break up the bridged manure. This is undesirable, however, because the auger cannot effectively keep moving manure toward the expeller while being raised above its normal position. Therefore, it is an object of this invention to provide a material breaking device for breaking up manure bridging in the type of spreader generally disclosed in U.S. Pat. No. 4,362,272 while allowing the auger to be maintained in a position for moving manure toward the expeller at all times.

DESCRIPTION OF THE PREFERRED EMBODIMENT

Figure 1:
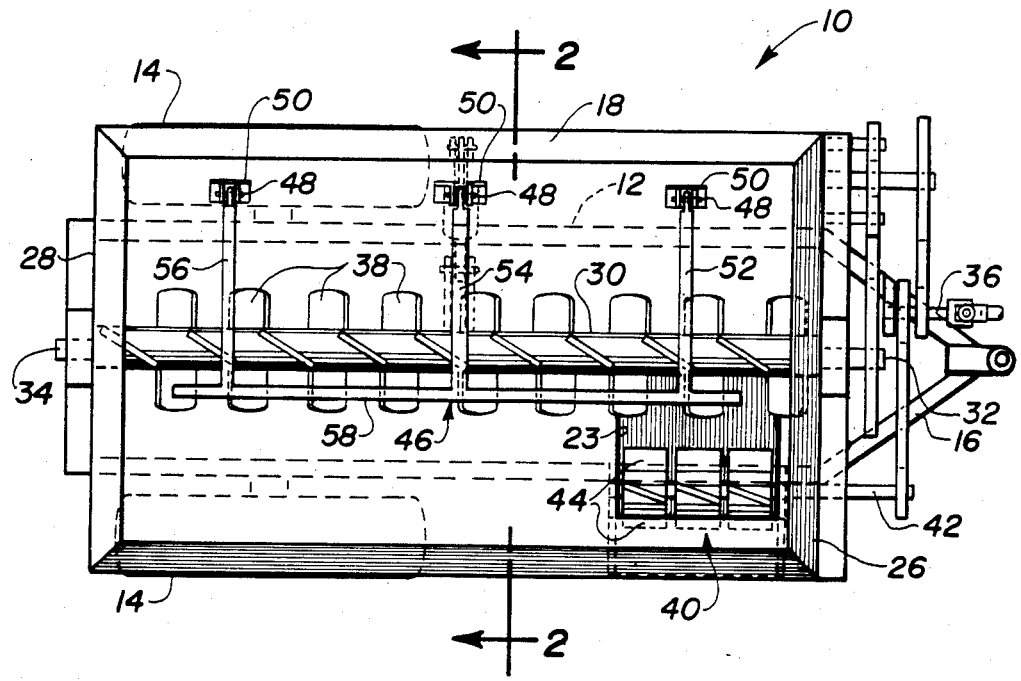
FIG. 1 is a top plan view of a manure spreader incorporating one embodiment of the present invention.
Figure 2:
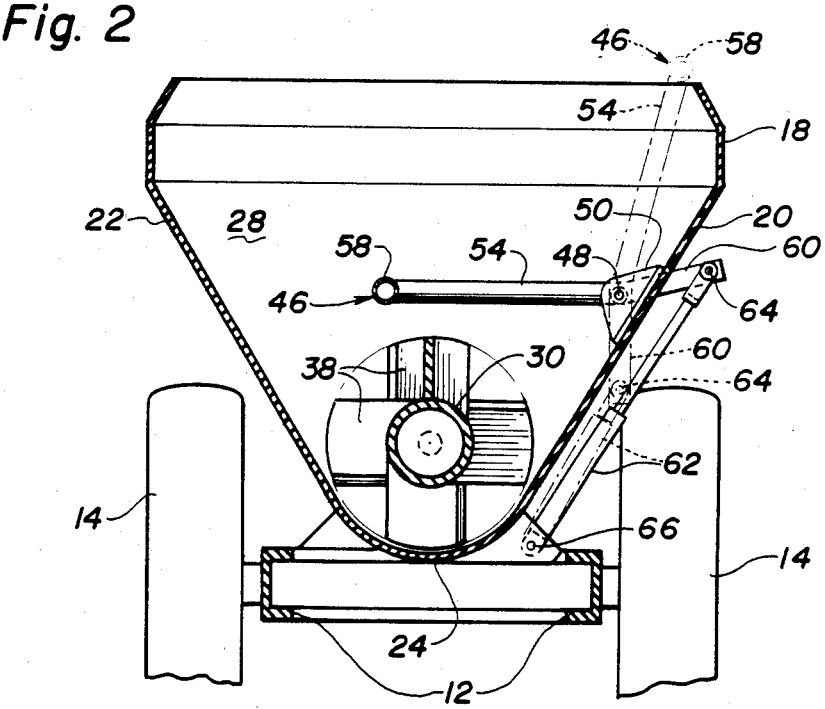
FIG. 2 is an enlarged sectional view taken along lines 2—2 in FIG. 1.

Referring generally to FIG. 1, a spreader 10 includes a base frame 12 supported by wheels 14. A tongue 16 is provided at the forward end of the base frame 12 and is adapted for connection to a towing vehicle such as a tractor (not shown). A tank 18 for containing manure is mounted on the base frame 12, and includes sidewalls 20,22 converging or sloping toward each other and merging into a bottom wall 24 as seen in FIG. 2. The tank 18 also has endwalls 26,28 disposed substantially parallel to each other.

An auger 30 is rotatably mounted in the bottom of the tank 18. The auger 30 has stub shafts 32,34 at its ends extending through and rotatably disposed in bearings carried on the endwalls 26,28 of the tank 18. Stub shaft 32 is driven from a shaft 36 which is adapted for connection to the PTO of a tractor. The auger 30 includes paddles 38 arranged to move manure toward an opening 23 formed in the sidewall 22 of the tank 18 when the auger 30 is rotated by the tractor PTO, and an expeller assembly 40 is provided at this opening 23 in the tank sidewall 22 to discharge manure laterally from the tank 18. The expeller assembly 40 includes a central shaft 42 which is driven from the shaft 36. The expeller assembly 40 preferably includes a plurality of paddles 44 mounted on further shafts which are connected to be rotated with and around the central shaft 42.

According to the present invention, a material breakup device 46 is pivotally connected by pins 48 to brackets 50 mounted on the inside of the sidewall 20 of the tank 18. The material breakup device 46 includes three legs 52,54,56, each of which is coupled at one end to one of the brackets 50 by one of the pins 48. The material breakup device 46 also includes a bar 58 which is rigidly connected such as by welding to the ends of the legs 52,54,56 opposite the brackets 50. The bar 58 extends lengthwise of the tank 18 and is disposed substantially parallel to the axis of the auger 30.

A lever 60 is fixed to the leg 54 of the material breakup device 46, and a hydraulic cylinder 62 of the double acting type is pivoted at its upper end to the lever 60 by a pin 64. The lower end of the hydraulic cylinder 62 is pivotally connected to the frame 12 by a pin 66. The lever 60 passes through a slot formed in the sidewall 20 of the tank 18, and a conventional sealing device (not shown) is provided around the lever 60 to prevent leakage of manure through the slot.

While loading manure into the tank 18 and during normal discharging of manure from the tank 18 by the expeller assembly 40, the material breakup device 46 is kept in the upper position shown in phantom in FIG. 2 where it is adjacent the tank sidewall 20. If manure becomes fully or partly bridged above the auger 30, the material breakup device 46 will be moved toward the lower position shown in full lines in FIG. 2 where it is adjacent the auger 30 by extending the hydraulic cylinder 62 which causes the legs 52,54,56 to pivot on the pins 48. Movement of the material breakup device 46 from the upper position to the lower position causes the legs 52,54,56 and the bar 58 to move downward with the tank 18 toward the auger 30 to contact the bridged manure and thereby effectively break up the bridged manure. The material breakup device 46 may be moved back and forth between the upper and lower positions shown in FIG. 2 whenever desired by selectively contracting and extending the hydraulic cylinder 62.

The following claims are intended to cover all modifications and variations of the preferred embodiment of the material breakup device disclosed herein without departing from the spirit and scope of the invention.

Having thus described the invention, what is claimed is:

1. In a spreader having a tank for containing manure, said tank including a pair of sidewalls and a pair of endwalls, an auger rotatably mounted in said tank for moving manure toward an opening formed in said tank, said auger extending between said pair of endwalls, and an expeller disposed adjacent said opening to discharge manure from said tank, the improvement comprising:

material breakup means pivotally mounted on one of said pair of sidewalls and movable within said tank toward said auger to break up manure in said tank that has formed into a bridge above said auger;

said material breakup means including a plurality of legs each pivoted to said one sidewall and a bar connected between said plurality of legs, said bar being disposed substantially parallel to the axis of said auger; and a lever fixed to one of said plurality of legs and extending through said one sidewall, and a hydraulic cylinder connected at one end to said lever so that extension and contraction of said hydraulic cylinder causes said material breakup means to move between upper and lower positions within said tank.

2. The improvement of claim 1, wherein said material breakup means moves from said upper position toward said lower position to break up a manure bridge above said auger.

3. The improvement of claim 2, wherein said material breakup means is maintained in said upper position during loading of manure into said tank and during normal discharging of manure from said tank by said expeller.

* * * * *